March 10, 1959  H. A. DZAACK  2,876,543
DEVICE FOR DETERMINING MEASURES OF DIVISION
BY MEANS OF AN ADDITIONAL SCALE
Filed July 23, 1954  11 Sheets-Sheet 1

Inventor
H. A. Dzaack

March 10, 1959  H. A. DZAACK  2,876,543
DEVICE FOR DETERMINING MEASURES OF DIVISION
BY MEANS OF AN ADDITIONAL SCALE
Filed July 23, 1954  11 Sheets-Sheet 2

Inventor
H. A. Dzaack

March 10, 1959 H. A. DZAACK 2,876,543
DEVICE FOR DETERMINING MEASURES OF DIVISION
BY MEANS OF AN ADDITIONAL SCALE
Filed July 23, 1954 11 Sheets-Sheet 3

Inventor
H. A. Dzaack

March 10, 1959  H. A. DZAACK  2,876,543
DEVICE FOR DETERMINING MEASURES OF DIVISION
BY MEANS OF AN ADDITIONAL SCALE
Filed July 23, 1954  11 Sheets-Sheet 5

Inventor
H. A. Dzaack

March 10, 1959  H. A. DZAACK  2,876,543
DEVICE FOR DETERMINING MEASURES OF DIVISION
BY MEANS OF AN ADDITIONAL SCALE
Filed July 23, 1954  11 Sheets-Sheet 8

Fig. 24

Inventor
H. A. Dzaack

March 10, 1959

H. A. DZAACK 2,876,543

DEVICE FOR DETERMINING MEASURES OF DIVISION
BY MEANS OF AN ADDITIONAL SCALE

Filed July 23, 1954

Inventor
H. A. Dzaack

March 10, 1959  H. A. DZAACK  2,876,543
DEVICE FOR DETERMINING MEASURES OF DIVISION
BY MEANS OF AN ADDITIONAL SCALE
Filed July 23, 1954  11 Sheets-Sheet 10

Inventor
H. A. Dzaack

March 10, 1959  H. A. DZAACK  2,876,543
DEVICE FOR DETERMINING MEASURES OF DIVISION
BY MEANS OF AN ADDITIONAL SCALE
Filed July 23, 1954  11 Sheets-Sheet 11

Inventor
H. A. Dzaack

United States Patent Office 2,876,543
Patented Mar. 10, 1959

2,876,543

A DEVICE FOR DETERMINING MEASURES OF DIVISION BY MEANS OF AN ADDITIONAL SCALE

Heinz Adolf Dzaack, Eskilstuna, Sweden, assignor to Kooperativa Forbundet, Ekonomisk Forening, Stockholm, Sweden Application July 23, 1954, Serial No. 445,400

Claims priority, application Sweden March 23, 1954

19 Claims. (Cl. 33—1)

This invention relates to a device for determining measures of division of a scale by means of an additional scale.

On determining scale division increments on longitudinal or circular scales each divisional increment has to be counted, particularly if the divisions between the increments are narrow. Such a counting does not only take time but also implies the possibilities of reading the values incorrectly.

The present invention has for its object to exclude such sources of errors. Further, an object of the invention is to provide means for unequivocal determination and rapid reading of even narrow divisions by means of direct reading-off of figures or other appropriate signs characteristic of the divisional increments which are to be measured. In this case even the graduation of such divisional increments can be dispensed with.

In the device according to the invention one of the scales, either a primary or secondary has in a manner known per se evenly spaced testing or indexing means and the other has evenly spaced engagement means for the testing or indexing means in which device the indexing and engagement means are mutually arranged according to a vernier principle.

It is characteristic of the invention that the scales are superpositioned on each other; that the engagement means are distributed along a circular arc of one of the scales as recesses in said scale perpendicularly to the plane of said scale; and that the testing or indexing means comprise axially movable pins distributed along an equivalent concentric circular arc of the other scale, said pin being coaxial with or engageable with a recess at coincidence between the recess and a pin.

The principle of the invention may be adapted on curved scales as well as on linear scales.

Other characteristics will be apparent from the following description of some embodiments shown as examples in the accompanying drawings.

A steel rule 41 comprising a linear scale in Figs. 1–5 is divided and numbered in millimetres. The steel rule is movably displaceable by means of rollers 43 and 44 which are fastened in a casing 45. At each centimetre an aperture 42 is provided in the steel rule 41. Instead of providing the steel rule with a division in millimetres a number of testing or indexing pins 46 are provided in such a way that each millimetre between the centimetre apertures is provided with its own indexing means. The diameter of each indexing pin 46 is for example one millimetre less than the diameter of the aperture 42 of the steel rule 41 and said pins are positioned opposite the apertures 42 with a distance of nine millimetres counted from the centres of the pins. The pins 46 are movable against the action of spring means in a holder 47, each of the indexing pins 46 being provided with an independent strip spring 48 in the preferred embodiment, pressing the pins against the holder 47. The holder 47 is movable in the housing 45 and guided by means of pins 50. The pins 50 are fastened to a manipulating rod 51. In rest position a spring 52 presses the whole testing or indexing mechanism against the casing 45. The ends of the indexing pins are provided with numerals from 0 to 9 corresponding to the numbers of millimetres.

Figures 1, 2:
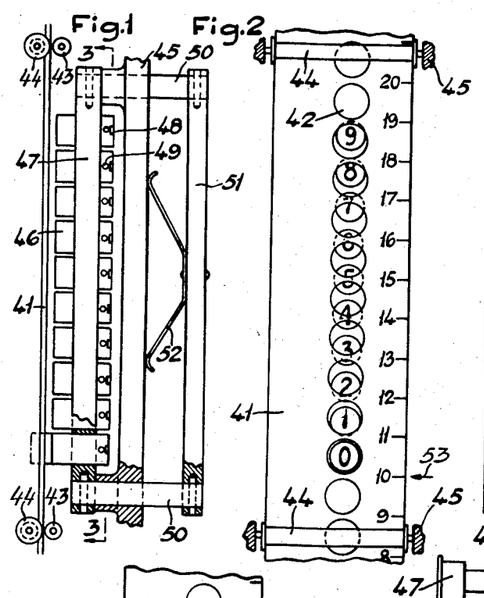
Fig. 1 shows a side elevational view of a device for determining millimetres on a steel rule.
Fig. 2 shows the same device in elevation looking from left to right at Figure 1.
Figure 3:
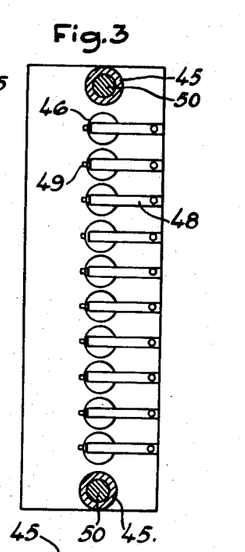
Fig. 3 shows the same device sectionally on the line 3—3 in Fig. 1.
Figure 4:
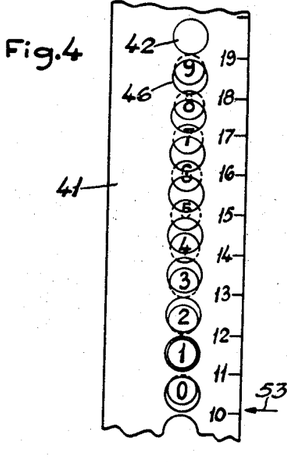
Fig. 4 shows the same device in elevational view in measuring position after advancing the steel rule 1 millimetre.
Figure 5:
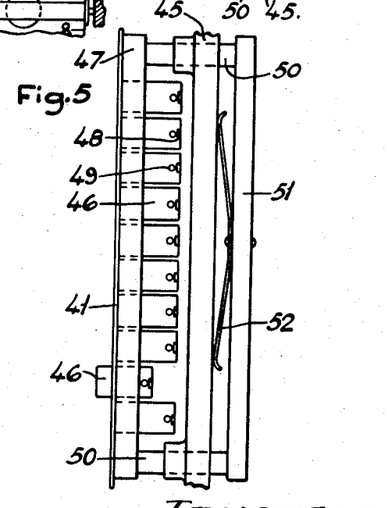
Fig. 5 shows the same device as in Fig. 4 in a side view.

The operation of the device will now further be described. The steel rule 41 of Figs. 1 and 2 is in Figs. 4 and 5 moved one millimetre reckoned from an indicating portion 53. When the shaft 51 is pushed, the holder 47 with the indexing pins 46 moves towards the steel rule 41 and the spring 52 is compressed. As mentioned above, the dimensional arrangements of the indexing and engagement means and their mutual distances are such that according to each millimetre displacement only a single indexing pin can coincide with an aperture of the steel rule, for instance at a displacement of the steel rule from the numeral 10 of the division of one millimetre, the indexing pin marked "1" coincides with an exactly confronting aperture in the steel rule. If the displacement be two millimetres, the pin indicated by "2" coincides, and with a displacement of three millimetres the pin indicated by "3" will coincide etc. As is shown in Figs. 4 and 5, in position of measuring and reading, an indexing pin 46 passes through an aperture of the steel rule while the other pins rest on the steel rule, their springs 48 being pressed back. The steel rule indicates directly the value "10.1." After recording the reading, the shaft 51 is released and the spring 52 presses the pin holder together and all the indexing pins 46 thereof are resiliently urged by the springs 48 back in their initial position.

Figure 6:
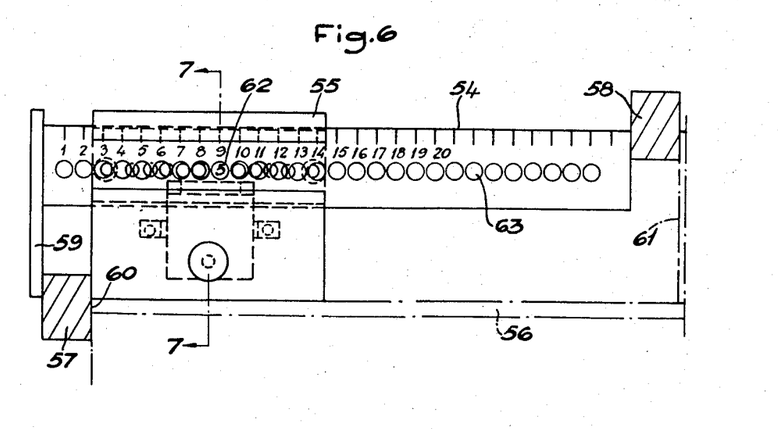
Fig. 6 shows in a longitudinal view another device for length measuring in the form of a linear scale.
Figures 7, 8:
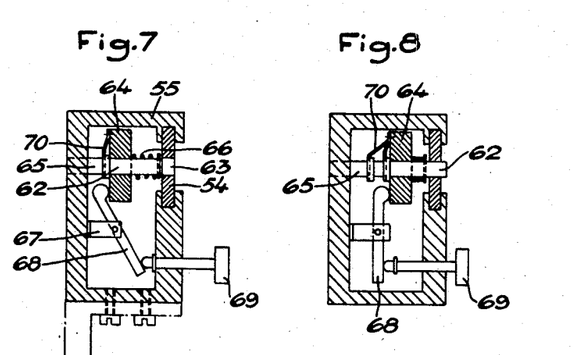
Fig. 7 shows the same device in a section taken on the line 7—7 in Fig. 6 before passing an indexing or testing pin through a reading-off aperture.
Fig. 8 shows the same section as Fig. 7, after the pin has passed through the aperture.
Figure 9:
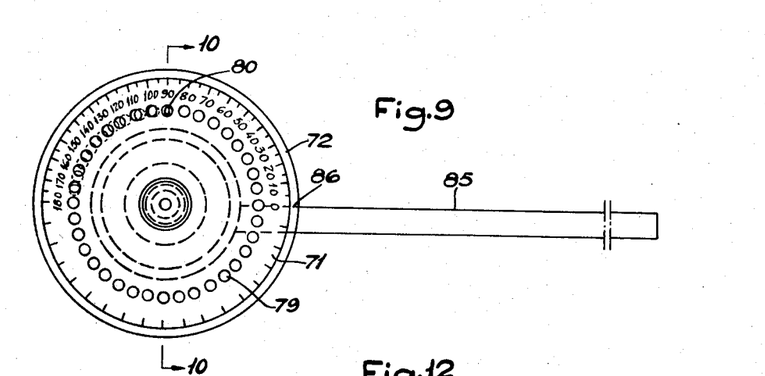
Fig. 9 shows in a view from above a device for measuring an angle in the form of a circular scale.
Figure 10:
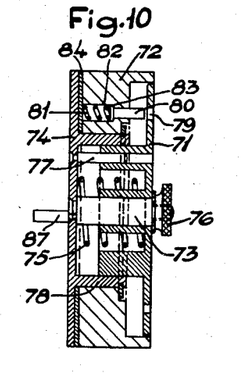
Fig. 10 shows a section on the line 10—10 in Fig. 9 before passing a pin through a reading-off aperture.
Figure 11:
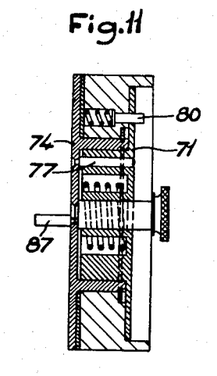
Fig. 11 shows the same section as Fig. 10 after passing through the pin.
Figure 12:
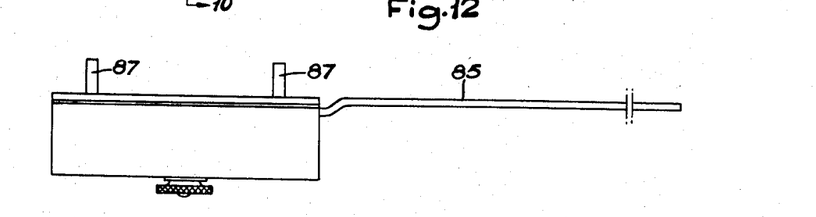
Fig. 12 shows the device according to Fig. 9–10 in an elevational view.

The modified linear scale device shown in Figs. 6–8 comprises an apparatus enabling the measuring of a piece of work directly in the machine or another position of work. This apparatus has a scale 54 inserted as a wall portion in a housing 55 which contains the vernier arrangement, said scale and said housing being movable in relation to each other. In the example shown, the housing 55 is fastened in the machine 56 or upon the table of work, and in order to illustrate, two pieces of work 57 and 58 are shown to be measured simultaneously, one of said work pieces 57 being positioned at the left between a butt 59 upon one end of the scale 54 and the corresponding end edge 60 of the machine, and the other 58 of said work pieces being positioned at the right between the other end of the scale 54 and a corresponding butt 61 of the machine 56. The ascertaining of measurement of the number of principal units is effected at the left border of the housing 55 while the number of subdivisions of the principal unit is measured by means of an indexing pin 62 passing through an indicating aperture 63 of the scale 54. The pins 62 are carried by means of a pin holder 64, this holder being in turn carried by means of guiding pins 65 in the housing 55 and being forced in its resting position by means of resilient means 66 from the scale 54. A lever mechanism is provided to move the pin holder against the action of the springs 66 towards the scale 54 which lever mechanism comprises a link member 68 intermediately pivotally supported by means of a bracket 67 in the housing, said link member being movable by means of a push knob 69. The indexing pin 62 which arrives opposite an indicating aperture is urged by means of the spring 70 through the aperture so that the marking indicates, for instance "5" in Fig. 6, is exposed at the same time as the other pins are prevented from passing through owing to the fact that they do not coincide coaxially with the apertures.

A practical embodiment shown in Figs. 9–12 comprises an angular scale with a ruler particularly disposed for plating shop works. Said scale is constructed as a circular scale provided with a primary scale 71 and a vernier scale 72 concentrically therewith, both scales being rotary in relation to each other one of the scales being provided with testing or indexing pins and the other with recesses or apertures. In the illustrated construction the primary scale 71 is to be considered as stationary from the point of view of rotation and the vernier scale 72 as turnable in relation to the first-mentioned scale. The primary scale 71 is supported by a shaft 73 which is positioned upon a base plate 74 toward which the primary scale 71 is movable against the action of a spring 75. A nut 76 upon the shaft 73 limits the movement of the primary scale 71 from the base plate 74, and a guiding pin 77 fastened on the base plate engages the primary scale and prevents the same from turning in relation to the base plate. The base plate 74 forms a hub 78 around which the vernier scale 72 is rotatable. In the illustrated construction the primary scale 71 is provided with a division and indicating apertures 79 and the vernier scale 72 with testing or indexing pins 80 marked at their ends, and said first scale is movable in relation to the other one. Although the primary scale has the aperture 79 and the vertical scale is shown to include the indexing pins 80, it is considered within the purview of invention to reverse the apertures and pins on the scales. The indexing pins 80 are forced outward by means of springs 81 positioned in guides 82 in the vernier scale 72 between annular collar means 83 on the pins and a cover plate 84 on the bottom side of the vernier scale. When the primary scale 71 is pressed down the same is moved toward the vernier scale 72, the spring 75 being simultaneously compressed. The vernier scale 72 is turned by a tracing rule 85 and when the primary scale 71 is pressed down a vernier pin 80 passes through an aperture 79 in the primary scale. Each vernier pin is provided with a marking, so that the subdivision can be read off immediately. An indicating position 86 on the tracing rule indicates the number of principal units. The whole arrangement is stopped simultaneously by the vernier pin being brought in abutment with the aperture of the principal scale, and in this way the tracing operation is considerably simplified. In order to place this measuring apparatus directly against the edge of a plate, two abutment pins 87 are arranged on the base plate 74 and can be removed from the plate in question.

Figures 13, 18:
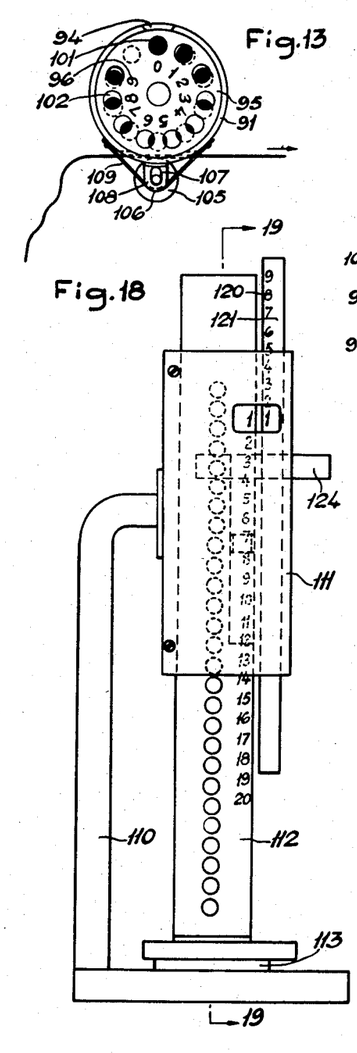
Fig. 13 shows in a side view a length measuring device for a band or a wire in the form of a circular scale.
Fig. 18 shows the device of Fig. 16 in a measuring position.
Figure 14:
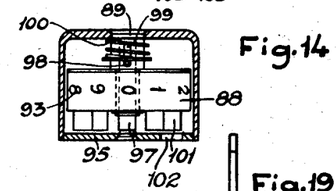
Fig. 14 shows said length measuring device in a view from above, partially in a horizontal section.
Figure 15:
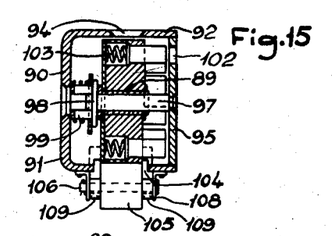
Fig. 15 shows said length measuring device in a vertical section.
Figure 16:
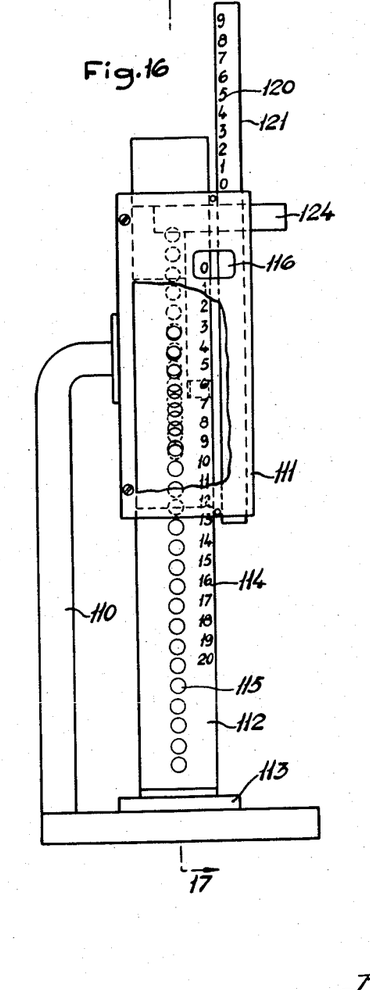
Fig. 16 shows in a side elevational view a device for length measuring in the form of a linear scale in a starting position.

The construction shown as an example in Figs. 13–15 refers to a measuring apparatus for the determination of curves and lengths. The apparatus has a drum 88 rotatably arranged upon a tubular shaft 89 attached to the bottom 90 of a housing 91 providing an enclosure 92 surrounding the device. This drum is provided around its circumference with indicia 93 for the numbers of length units comprising the principal scale, said numbers being visible through a window 94 provided in the jacket or enclosure 92 of the housing 91. A secondary scale 95, the vernier scale, not turnable in relation to the jacket 92, consists of a disc provided with indicia 96 for the subdivisions of the length unit and is disposed coaxially with the drum and the jacket adjacent to the open end of said jacket, a shaft 97 attached to the vernier scale 95 being journalled within the shaft 89. The vernier disc 95 is prevented from turning in relation to the jacket by means of a guide pin 98 passing through its shaft 97 which is guided by a slot 99 in the tube 89. A spring 100 positioned between the pin 98 and the bottom 90 of the housing keeps the vernier disc 95 forced outwardly. Differing from the foregoing examples, in this construction the principal scale, viz the drum 88, is provided with indexing pins 101 spaced in correspondence with the division of said scale and the vernier scale is provided with reading-off apertures 102 in correspondence with the vernier division. The indexing pins 101 are axially movable in the drum 88 and are kept pressed outwardly against the vernier disc 95 by means of springs 103. The jacket is provided with an aperture 104 for forcing a roller 105 against the drum 88, said roller being positioned on a shaft 106 guided in slots 107 in a bracket 108 attached to said jacket. Springs 109 press the roller 105 toward the drum 88.

If a band, a wire or the like is positioned between the roller 105 and the drum 88 and said band etc., for instance as in Fig. 13 is drawn toward the right, the drum turns itself in correspondence with the length of the band etc., which is drawn through the apparatus. If curves are to be measured instead, the roller 105 is rolled along the curve, whereby the drum rotates in correspondence with the path run by the roller 105 along said curve. The number of the higher order is read off through the window 94 and that of the lower order is read off—after pressing on the vernier scale 95—by means of a pin passing through one of the numbered reading-off apertures. The reading-off result cannot be displaced at the same time as the apparatus is stopped as long as the vernier scale is pressed down. The device can also be utilized for measuring the largest lengths, wherein an appropriate number of drums are brought together and are provided with a mechanism for the transfer of ten numbers or the like.

The registering by means of printing or the like of the result of the measuring is simplified or made possible, if all the markings and numbers are arranged along one line, the stampling line. Such a registering or reading-off of the markings or numbers at a more closely determined place is made possible by means of a marking sign transfer device from the indexing pins to the reading-off place.

Figure 17:
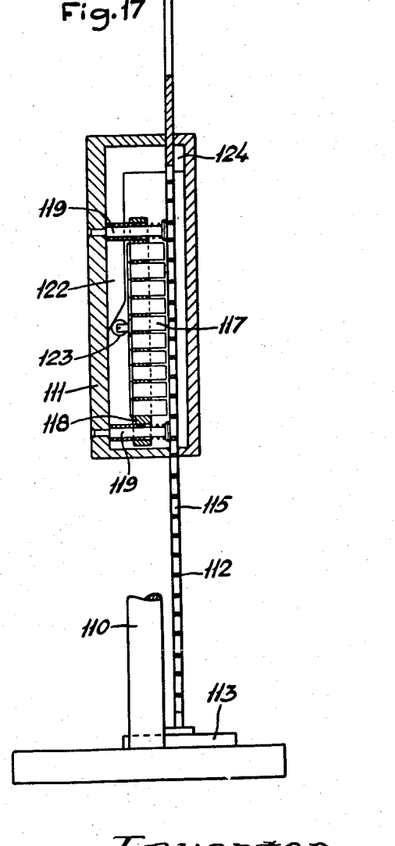
Fig. 17 shows this device in a vertical section on the line 17—17 in Fig. 16.
Figure 19:
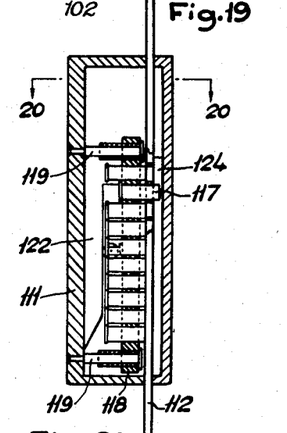
Fig. 19 shows in part a vertical section of the device in the measuring position thereof according to Fig. 18 taken on the line 19—19 in Fig. 18.
Figure 20:
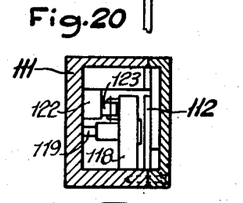
Fig. 20 shows a horizontal section of the device on the line 20—20 of Fig. 19.

Figs. 16–20 show as an example of such an embodiment an apparatus for rapid determination of measure of lengths of for instance a piece of work. Upon a stand 110 a housing 111 is arranged, in which a primary scale or main scale 112 is movable to and from a foot plate 113 upon the stand. The main scale 112 is provided with a division 114 of the numbers of units of the measuring quantity and apertures 115 for testing or indexing pins distributed in correspondence with said division and said division is to be read off in the left portion of a window 116 in the housing 111. In the housing indexing pins 117 are carried by a pin holder 118 which is placed upon guide pins 119 and along the latter movable relatively to the main scale. In contradistinction to the previous embodiments the indexing pins 117 are not utilized for direct reading-off but instead for setting a secondary scale 121 provided with indicia 120 for the numbers of subdivision of the quantity and disposed opposite the primary scale 112 in the housing 111 in such a manner that the reading-off of said secondary scale is brought about in the right portion of the window 116. The secondary scale 121 provides means for moving the pin carrier 118 toward the primary scale 112 for passing an indexing pin 117 through an aperture 115 in the primary scale (Fig. 19). For this purpose the secondary scale 121 carries a yoke lever formed as a guide cam 122 which, when the scale 121 is moved downward, acts upon a roller 123 carried by the pin holder 118 and serving as a shoulder for the guide cam in such a manner that the vernier including pins 117 and carrier 118 goes toward the scale 112 at which time a vernier pin 117 passes through one of the apertures 115. The secondary scale 121 is provided with an arm 124 by means of which the scale 121 and cam 122 are moved, the reading-off position of the secondary scale 121 being established when its inwardly extended arm 124 is brought into contact with the vernier pin 117 which has passed through an aperture 115 so that the right portion of the reading-off window 116 and the correct subdivision number 120 is exposed. By providing the scales with printed types corresponding to the reading-off markings and a printing mechanism the registering of the result of the measuring can be made on a strip or the like. As seen in Fig. 17 suitable springs are circumposed on the pins 119 in engagement with the carrier 118 for urging the pins 117 thereon out of engagement with the apertures 115.

Figure 21:
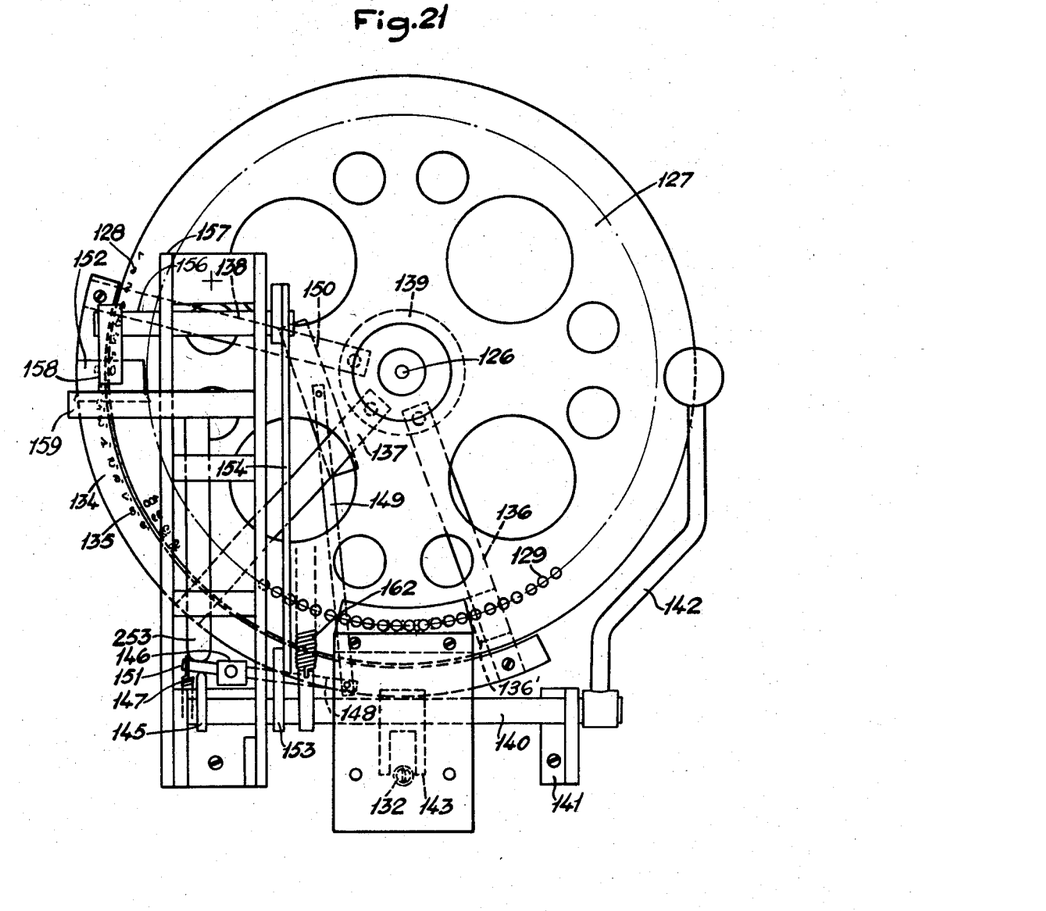
Fig. 21 shows in a rear view a weighing scale of the circular type for a weighing apparatus provided with a pirnting device for stamping the weighing dates of the primary and the secondary scales upon a ticket.
Figure 22:
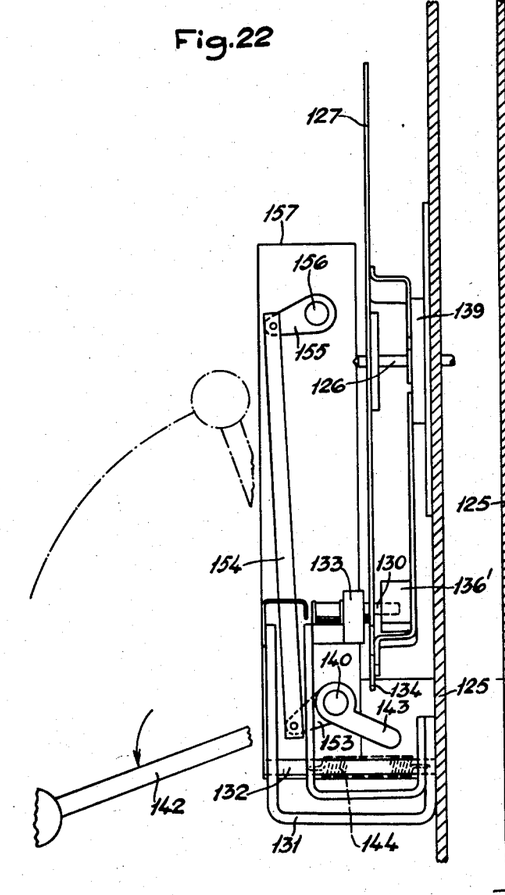
Fig. 22 shows the weighing scale of Fig. 21 in a side elevational view seen from the right of Fig. 21.
Figure 23:
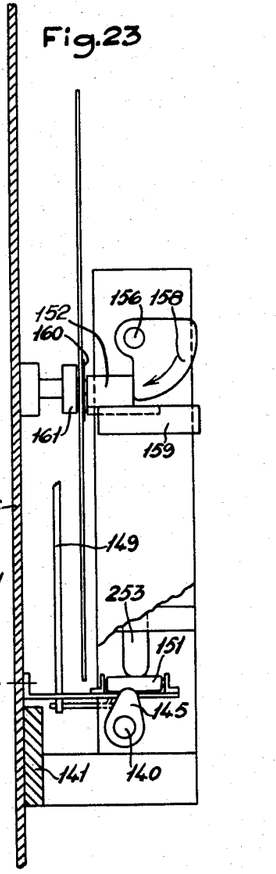
Fig. 23 shows the weighing scale of Fig. 21 in a side elevational view seen from the left of Fig. 21.

Figs. 21–23 show an apparatus for registering circular divisions particularly intended for weighing apparatus for registering the weight by stamping on a sheet, a strip etc.

On a wall portion 125 on the reading-off cap of the weighing apparatus a pointer shaft 126 is rotatably mounted which carries a primary scale 127 provided with a division in the form of printing types 128 corresponding to the weight unit disposed in a circle and apertures 129 for testing or indexing pins 130 in correspondence with this division. On the same wall portion 125 a bracket 131 is arranged which upon guide pins 132 carries a pin holder 133 provided with indexing pins 130 concentrically arranged in relation to the apertures 129 of the primary scale 127 and movable toward said primary scale. A secondary scale 134 is provided with a division comprising printing types 135 which indicate the subdivisions of the unit of measure and said secondary scale is concentrically arranged in relation to the primary scale 127 outside its periphery and is carried by arms 136, 137, 138 attached to a center piece 139 rotatably mounted upon the shaft 126. The primary scale 127 is arrested after the same has completed its partial rotation, this arresting being affected thereby that one of the indexing pins 130 passes through any of the apertures in the scale 127. The secondary scale 134 is set so that its arm 136 is brought into contact with the indexing pin 130 having passed through, by means of which a measuring number transfer of principally the same kind as in the device according to Figs. 16–20 is effected, so that the subdivision of the measuring unit on the secondary scale corresponding to the testing pin which has passed through is moved to reading-off position opposite the unit number of the quantity on the primary scale.

In order to operate the scales and to effect the stamping a shaft 140 is rotatably mounted in supports 141 attached to the wall portion 125 and rotatable in steps by means of a handle 142. After a weighing operation and the scale comes to rest, handle 142 is activated and in a first step, a first cam means 143 provided on the shaft 140 disengages the pin holder 133 which by means of a tension spring 144 is drawn toward said primary scale 127. In a succeeding step of movement of the shaft 140, a second cam means 145 moves the secondary scale 134 to its reading-off position opposite the primary scale 127. This is effected whereby the second cam means 145 acts upon a double lever means carried by a stationary fulcrum 146 provided on the wall portion 125 and held by a spring 147. One arm 148 of said double lever by means of a rod 149 attached to the arms 137, 138 by a link member 150 moves the secondary scale to registering position, and the other arm 151 of said double lever moves a stamping mechanism downward to printing position, so that a stamp pad 152 is brought quite opposite the printing types on the scales which indicate the total weighing sum in question. This movement is imparted to the stamping mechanism by means of a rod 253 resting upon the lever 151. The movement of the secondary scale 134 and the movement of the stamping mechanism is determined by an abutment means 136' on the arm 136 which is set against the indexing pin having passed through.

On the shaft 140 is disposed a third disc 153 in the form of a link and is arranged in a third step of movement of the shaft 140 to bring the stamping mechanism into function, so that the printing is effected. During this step, the handle 142 is swung downward as shown by the arrow of Fig. 22, the force is transmitted from the rod 253 and a rod 154 to a link 155 which is attached to a shaft 156 rotatably mounted in a holder 157 carrying the stamping mechanism, the downward movement of said holder, see direction arrow of Fig. 23, to the stamping position of the stamping pad 152 being controlled by the rod 253. The rod 253 lowers, at recording, the bracket 159 for the pad 152. The link 155 turns the shaft 156 upon which a cam means 158 is attached which forces the stamping pad 152 journalled in a bracket 159 upon the stamping mechanism holder 157 toward a ticket (not shown) disposed between a ribbon 160 and the scales 127 and 134 acting as stamping discs rearward of which a fixed supporting pad 161 is positioned. When the handle 142 is released a tension spring 162 resets the stamping mechanism to its resting position. When the handle 142 is swung down for recording (the cam 145 is also swung down), the left end of the lever 151 becomes free to move downward under the action of the spring 147. The lever 151 is thus swung in a counter-clockwise direction and raises the rod 149, which moves the scale 134 in a clockwise direction in Fig. 21.

The device for printing and the weight shown in Figs. 21-23 can be replaced or completed with a number of transfer devices for making the weighing result visible in a window one half of which shows the number of the principal units and the other half of which shows the number of subdivisions. As an example thereof in Fig. 24 at a weighing scale such a reading-off device is included in combination with a stamping mechanism of the type just described and therefore it is unnecessary to repeat its construction.

Figure 24:
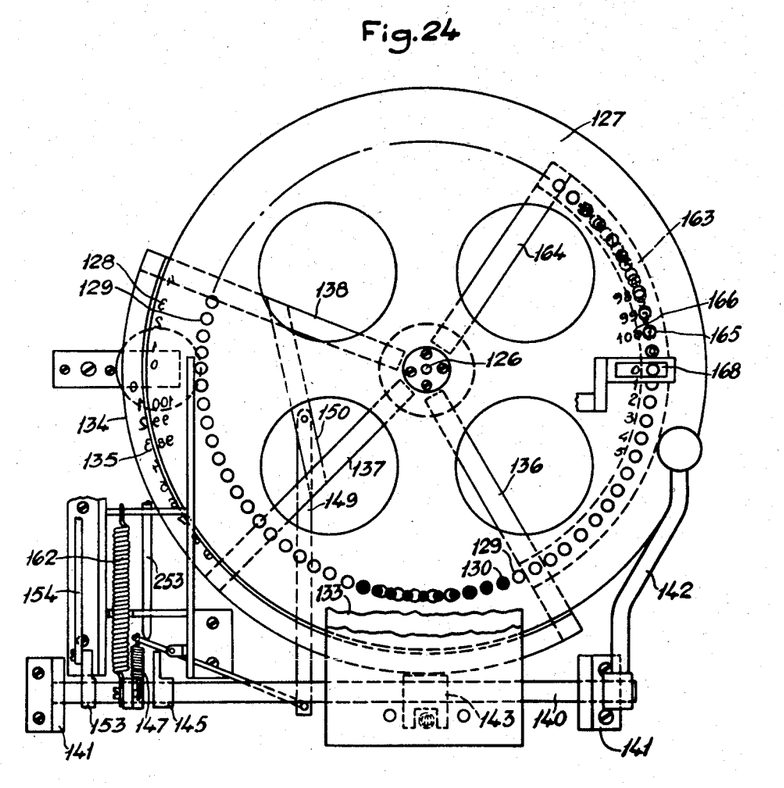
Fig. 24 shows in another rear view a similar weighing scale for a weighing apparatus provided with printing as well as reading-off mechanisms to determine the weight.

In the device according to Fig. 24 a further scale 163 is carried by arms 136 and 164 concentrically disposed at the rear of the main scale 127, said scale 163 being provided with indicia numbers 165 for the number of subdivisions of the quantity arranged in a distribution corresponding to a vernier principle in relation to the division 166 of the main scale which division corresponds to the apertures 129 of the main scale, said indicia numbers being arranged concentrically with the circle of apertures 129. The scale 163 turns itself together with the secondary scale 134 indicating sub-divisions of the weight quantity and is arrested simultaneously due to the fact that the arm 136 of the scale 134 is stopped by an indexing pin 130 passing through an aperture 129 in the main scale 127. To the rod 253 forcing the stamping mechanism to its stamping position, a wall portion is attached which is provided with a window 168, said window being brought by means of the mechanism operated by the handle 142 to a reading-off position in which the indication on the main scale for the number of principal units of the weight quantity is exposed in the left portion of the window and the indication on a reading-off vernier 163 comprised of figures oriented in a manner similar to pins 130, said figures indicating subdivisions of the weight quantity being exposed in the right portion of the window whereby the reading-off number 165 is freely exposed through an aperture 129 of the main scale 127.

In the devices hitherto described the reading-off has been indicated in an optical or mechanical way but such an indication can also be realized electrically as now will be shown.

In the device according to Figs. 25-28 testing or indexing pins 169 serving as electrical contacts and having a comparatively small diameter are attached to a pin holder 170 of insulating material, said pin holder being movable by means of a push member 171 along guide pins 172 arranged into a housing 173, the latter in its turn being movable along a column 174. In the housing also a scale 175 is movable which consists of an electrically conductive material and has a series of apertures 176 with indicia 177 appertaining thereto. The distribution of the apertures 176 and the distribution of the pins 169 are arranged in a vernier relation to each other. A current source 178 is connected by one of its poles to the scale 175 and by its other pole to a plurality of parallel current circuits 179, each of which comprising a contact pin 169 and a means connected in series therewith, in the illustrated case comprising a lamp 180 with a numbered window 181 which indicates the current closing of respective contact by the scale. It is evident that each time only a single vernier pin 169 can touch the scale 175, while the other pins extend into the apertures 176 of the scale, the number of principal units are read off at an indicating portion 182 and the number of subdivisions is signalled by the window lighted up by a lamp.

Figure 25:
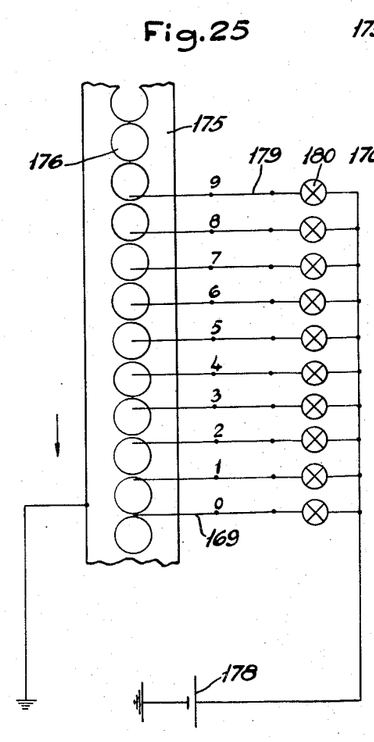
Fig. 25 shows schematically a linear scale device provided with electrical reading-off means.
Figure 26:
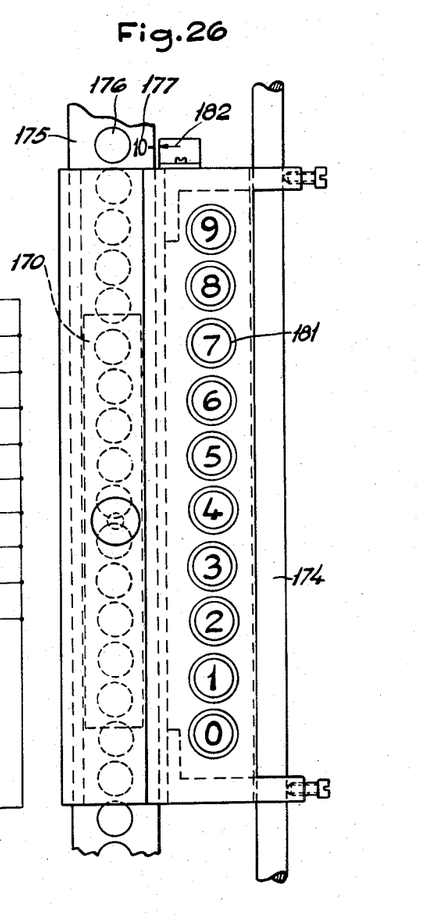
Fig. 26 shows the device of Fig. 25 in an elevational view.
Figure 27:
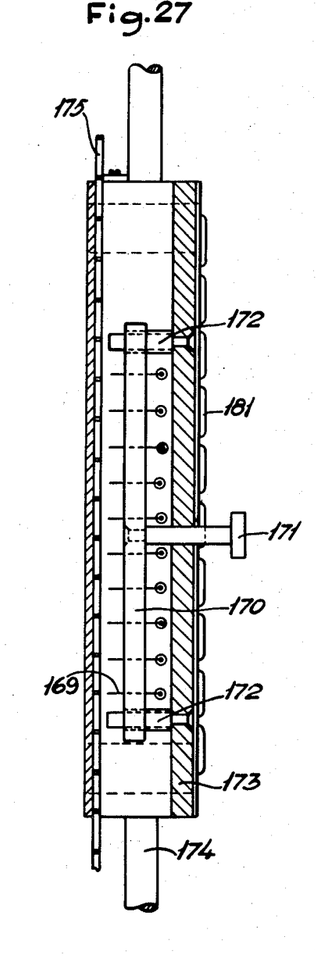
Fig. 27 shows the device of Fig. 25 in a vertical section.
Figure 28:
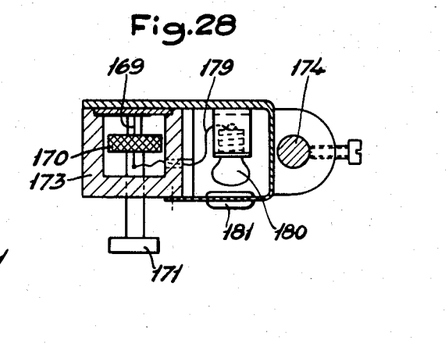
Fig. 28 shows the device of Fig. 25 in a horizontal section.

Instead of apertures 176 in the scale 175 recesses or inserts of insulating material may be conceivable.

Figure 29:
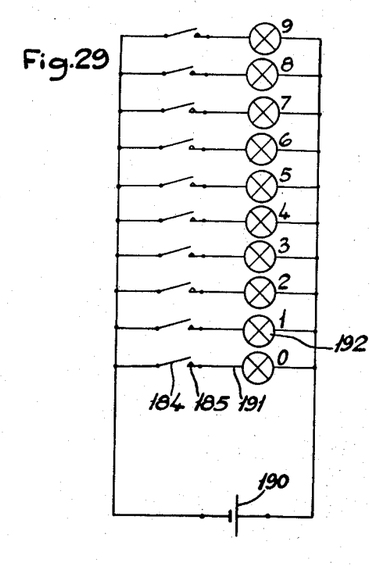
Fig. 29 shows another linear scale arrangement with electrical reading off-means in a schematical view.
Figure 30:
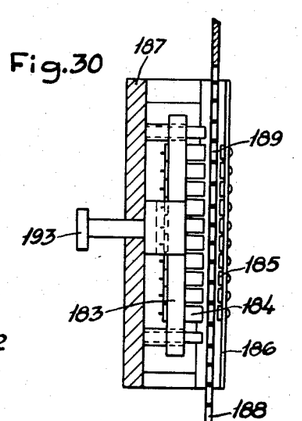
Fig. 30 shows an embodiment of the device according to Fig. 29 in a vertical section.
Figure 31:
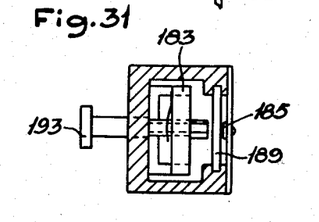
Fig. 31 shows the embodiment of Fig. 30 in a horizontal section.

In the device according to Figs. 29-31, a pin holder 183 is provided with electrical contacts in the form of axially moveable pins 184 carried by the pin holder 183. The testing or indexing pins 184 cooperate with a row of fixed electrical contacts 185 arranged on a wall 186 in a housing 187 in a distribution which corresponds to the placing of the pins 184 and disposed in front of the pins in the direction of movement thereof. Further, in the housing a scale 188 is arranged movable thereto between the pin holder 183 and the row of fixed contacts 185, the scale is provided with a series of apertures 189 insulated in relation to the pins and arranged according to the vernier principle. A current source 190 is connected to a number of parallel current closing circuits 191 in either of which a contact pin 184 is included and a fixed contact 185 corresponding to the pin as well as means in the form of a relay or, as shown, a numbered lamp 192 to indicate current closing between a pin 184 and its corresponding fixed contact 185. As the movement of the pin holder by means of a push knob 193 in the direction toward the fixed contacts 185 occurs only a single contact pin is in a coaxial position coincident with one of the apertures 189 of the scale 188 capable of passing through the scale to close a current circuit 191 in which said contact pin and said fixed contact are included, whereby the indicating means 192 included in this current circuit signals, where contact closing has occurred and further which subdivision of the measuring quantity the scale has measured. The number of the principal units can be indicated for instance in the manner that has been described in connection with the device according to Figs. 25-28.

Figure 32:
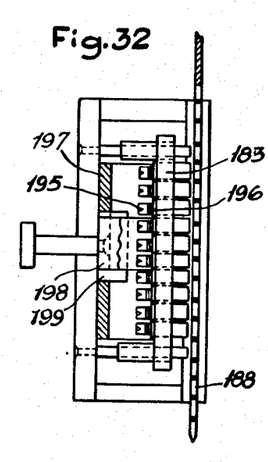
Fig. 32 shows another embodiment of the device according to Fig. 29 in a vertical section.
Figure 33:
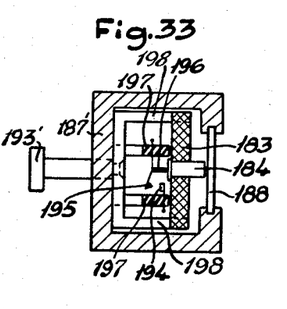
Fig. 33 shows the embodiment of Fig. 32 in a horizontal section.

In the device according to Figs. 32-33 is the just mentioned construction of Figs. 29-31 varied so that the fixed and the movable contacts 194 and 195, respectively, are both fixed on a casing 187' for the pin holder 183, and in the resting position of the pin holder, a resiliently carried movable contact 195 is forced from the fixed contact 194 by means of a member 196 attached to the inner end of the pin 184 and comprising for instance a rod of insulating material. The contacts 194 and 195 are secured on a U-shaped member 197 which is fixed to the casing 187'. The pin holder 183 is, also by means of a U-shaped member 198, fixed to the handle 193', which last-mentioned member 198 encloses the first-mentioned member 197. Member 197 has a notch 199 in order to allow the displacement of the member 198 in a direction to the right toward the scale 188. When the pin holder is forced toward the scale 188 one of the pins passes through an aperture in the scale in a coaxially coincident position between them, and then the spring of the contact 195, which has passed through an opening in the scale 188, becomes free to move toward the contact 194, but the other contacts 195 are prevented by their pins 184 and the parts 196 from moving toward their contacts 194. The electrical arrangement can be constructed as shown schematically in Fig. 29.

Several embodiments of the invention can be conceived and protection is therefore claimed from and to the extent that it is set forth in the following claims.

Having now described my invention what I claim as new and desire to secure by Letters Patent is:

1. In a device for determining divisional portions of a unit of measurement of a measuring instrument comprising a second and first scale means, one of said scale means including evenly spaced indexing means and the other scale means including evenly spaced engagement means in alignment with said indexing means, said indexing and engagement means having a vernier relationship whereby aligned portions thereof designate a divisional portion of unit of measurement of the measuring instrument, said scale means having relative movement in a path defined by said indexing and engagement means, said indexing means comprising a pin carrying member movable toward and away from said engagement means and including a plurality of spaced pin elements distributed on a scale forming a portion of the vernier relationship, said pin elements being displaceable axially relative to each other and said engagement means, said engagement means comprising linearly spaced receiving portions distributed on a scale on said other scale means forming a portion of the vernier relationship, means engageable with said pin elements for applying axial pressure thereto wherein a pin element coaxially aligned with one of said receiving portions will pass therein and remaining pin elements will be axially placed away from said engagement means, and means common to and acting simultaneously on all of said pin elements for returning all of said pin elements to a position out of engagement in spaced relationship from said engagement means.

2. In a device as set forth in claim 1 in which said receiving portions comprise apertures extending through said other scale means into which said pin elements will pass.

3. In a device as set forth in claim 2 in which said pin elements include indicia means on the end thereof, said indicia means indicating a subdivision of the unit of measurement represented by a pin element having passed through an aligned aperture portion.

4. In a device as set forth in claim 2 including a housing incorporating portions supporting said first and second scale means, a housing including a window portion, said window portion providing a direct reading of the unit of measurement of the measuring instrument, and means on said housing for reading divisional portions of the unit of measurement forwarded by the pin element extending through an aligned receiving portion.

5. In a device as set forth in claim 2 in which said one scale means comprises a drum member including peripheral indicia means spaced to indicate units of measurement, a housing member in which said drum member is journalled, said housing member including a window portion through which said indicia means may be observed, said indexing and engagement means being disposed on said housing and drum member concentric to the axis of rotation of said drum member.

6. In a device as set forth in claim 5 including a roller member journalled on said housing in peripheral engagement with said drum member whereby rotation of said roller member causes rotation of said drum member.

7. In a device as set forth in claim 1 in which each of said pin elements are spring biased axially.

8. In a device as set forth in claim 7 in which the first and second scale means respectively comprise primary and secondary scale members, said secondary scale member including an abutment portion engageable with one of said pin elements extending through an aligned receiving portion, and indicia means on said primary and said secondary scale members for affording a direct reading in the units of measurement of the device in terms of the units of measurement and divisional portions thereof.

9. In a device as set forth in claim 8 in which said primary and secondary scale members are rotatable on a common axis, said indexing and engagement means being disposed in concentric aligned relationship relative to said common axis.

10. In a device as set forth in claim 9 including a manually operated lever mechanism operatively connected to said pin carrying member for extending a pin element coaxially through an aligned receiving portion.

11. In a device as set forth in claim 1 including a fixed support member upon which said pin carrying member is mounted, said pin carrying member and pin elements being moveable in a plane normal to the scale means including said engagement means.

12. In a device as set forth in claim 11 in which said pin carrying member is movably supported relative to said support member, and said means for returning said pin elements includes resilient means interposed between said pin carrying and support members urging said pin carrying member and pin elements away from said engagement means.

13. In a device as set forth in claim 12 including a lever mechanism engageable with said pin carrying member to oppose the action of said resilient means.

14. In a device as set forth in claim 1 in which one of said scale means comprises a housing including the engagement means, said indexing means being contained in said housing.

15. In a device as set forth in claim 8 including a common support member for said primary and secondary scale members and said pin carrying member, said scale members being journalled in concentric relationship on said support member and having relative movement thereto and with respect to each other, said primary scale member including said receiving portions disposed concentrically in relation to the unit of measurement of the device, said pin elements being disposed concentric to and alignable with said receiving portions.

16. In a device as set forth in claim 15 in which said abutment portion comprises a radially extending element engageable with a pin element passed through a receiving portion of the primary scale member.

17. In a device as set forth in claim 16 said means for applying axial pressure including a manually operated mechanism operatively connected to said pin carrying member and including a first cam element operative to urge said pin carrying member toward said primary scale member to engage a pin element in one of the receiving portions and a second cam element operative to move said secondary scale member and radially extending element thereof into engagement with said pin element passing through one of said receiving portions.

18. In a device as set forth in claim 17 including an indicia printing assembly operatively associated with said primary and secondary scale members for recording the measurement obtained thereby, said second cam element including a portion operatively connected to said printing assembly for operating said printing assembly after the radially extending element has engaged one of said pin elements.

19. In a device as set forth in claim 15 including orientation means alignable with the indicia on said primary and secondary scale members whereby a reading can be obtained in units of measurement and subdivisions thereof.

References Cited in the file of this patent

UNITED STATES PATENTS

| 276,292 | Seymour | Apr. 24, 1883 |
| 1,616,612 | Dodds | Feb. 8, 1927 |
| 1,864,341 | Davie | June 21, 1932 |
| 2,089,757 | Nieuwkamp | Aug. 10, 1937 |
| 2,092,957 | Cuenoud | Sept. 14, 1937 |

FOREIGN PATENTS

| 218,911 | Switzerland | Apr. 16, 1942 |